United States Patent
Schramm, Jr. et al.

(10) Patent No.: US 7,017,812 B1
(45) Date of Patent: Mar. 28, 2006

(54) VARIABLE DISTANCE ANGULAR SYMBOLOGY READER

(75) Inventors: Harry F. Schramm, Jr., Winchester, TN (US); Eric L. Corder, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 167 days.

(21) Appl. No.: 10/730,191

(22) Filed: Nov. 26, 2003

(51) Int. Cl.
*G06K 7/14* (2006.01)

(52) U.S. Cl. ............. 235/454; 235/462.22; 235/462.41

(58) Field of Classification Search ................ 235/454, 235/462.22–462.24, 462.41, 462.43
See application file for complete search history.

(56) References Cited

U.S. PATENT DOCUMENTS

| | | | |
|---|---|---|---|
| 4,867,545 A * | 9/1989 | Wakimoto et al. .......... 359/663 |
| 5,168,454 A | 12/1992 | LaPlante et al. |
| 5,315,095 A * | 5/1994 | Marom et al. ......... 235/462.22 |
| 5,430,286 A * | 7/1995 | Hammond et al. .... 235/462.22 |
| 5,751,588 A | 5/1998 | Freedenberg et al. |
| 5,969,323 A * | 10/1999 | Gurevich et al. ...... 235/462.06 |
| 6,073,851 A | 6/2000 | Olmstead et al. |
| 6,269,169 B1 * | 7/2001 | Funk et al. .................. 382/100 |
| 6,330,974 B1 | 12/2001 | Ackley |
| 6,527,184 B1 | 3/2003 | Oliva |
| 6,689,998 B1 * | 2/2004 | Bremer ..................... 250/201.2 |
| 6,765,857 B1 * | 7/2004 | Yoo et al. .............. 369/112.06 |
| 2002/0051117 A1 | 5/2002 | Hauger et al. |
| 2002/0185610 A1 | 12/2002 | Stern |

* cited by examiner

*Primary Examiner*—Seung H Lee
(74) *Attorney, Agent, or Firm*—James J. McGroary; Stephen J. Stark

(57) ABSTRACT

A variable distance angular symbology reader utilizes at least one light source to direct light through a beam splitter and onto a target. A target may be angled relative to the impinging light beam up to and maybe even greater than 45°. A reflected beam from the target passes through the beam splitter and is preferably directed 90° relative to the light source through a telecentric lens to a scanner which records an image of the target such as a direct part marking code.

19 Claims, 3 Drawing Sheets

VARIABLE DISTANCE ANGULAR SYMBOLOGY READER

STATEMENT OF GOVERNMENT INTEREST

This invention described herein was made by employees of the United States Government and may be manufactured and used by or for the Government for Government purposes without the payment of any royalties thereon or therefore.

FIELD OF THE INVENTION

This invention relates to a variable distance angular symbology reader, and more specifically to a symbology reader employing the use of a telecentric lens, light source, and beam splitter to provide improved reading of symbols in low contrast situations.

DESCRIPTION OF RELATED ART

Automatic identification comes in many forms, the most familiar being bar coding because it is seen by the general population daily at retail outlets and grocery stores. Bar coding is generally applied on a product label or possibly with an applied sticky label. Other types of automatic identification are used when the mark is desired on the surface of the product (direct marking), thereby eliminating a label. Identification symbols marked directly on parts are visible and can be read with CCD (Charged Coupled Devices). At least one of the inventors has gone to great lengths to provide direct marking of parts in various readers as is shown in U.S. Pat. Nos. 5,742,036; 5,773,811; 6,395,151; and 6,529,154. Most of these references relate to the use of matrix code symbols having a data cell of squarish or other geometric units such as the Vericode® shown in U.S. Pat. No. 4,924,078 or the public domain Data Matrix in U.S. Pat. No. 4,939,354. There may be other matrix code symbols in use as well.

Direct part marking for identification has evolved to the point where optically visible marks, especially data matrix symbols that appear as checkerboard style bar codes on parts, can be provided on almost any surface. Many of the surfaces and their associated lighting conditions however are not particularly friendly to the CCD scanner that is normally used to capture the image of the data matrix symbol and then decode it. Sometimes there is simply not enough contrast between the data elements of the checkerboard symbol and the substrate around and within its boundaries to enable the scanner to distinguish between the data elements and the non-data elements.

Surfaces such as highly polished or smooth reflective surfaces are traditionally not friendly to conventional CCD scanners. Adding curvature to the surface makes it especially troublesome for adequate image capture. In these type surfaces matrix symbols can be applied directly to the substrate with methods such as dot-peen which provide a mark with no special characteristics (darkness) other than a depth of the data elements. These elements, the data elements, have the same reflectivity as non-data elements. This makes the matrix symbol relatively low in contrast such that it can barely be visible to an optical reader (CCD device). In this situation there may simply not be enough contrast between the data elements of the checkerboard symbol and the substrate around and within its boundaries to enable the scanner to distinguish between the data elements and the non-data elements.

Accordingly, a need exists for an improved optical imager.

Numerous attempts have been made to provide improved symbol reading technology including U.S. Patent Application Publication Nos. 2002/0185610, 2002/0051117, and U.S. Pat. Nos. 6,527,184, 6,330,974, 6,037,851, 5,751,558 and 5,168,454. In spite of the advances in the prior art, there still remains a need for an improved symbology reader.

SUMMARY OF THE INVENTION

An object of the present invention is to provide an optical imager having an ability to read very low contrast marks;

Another object of the present invention is to read symbols angularly offset from the central line of sight of the scanner;

Another object of the present invention is to provide an optical imager having a telecentric lens that captures matrix symbol images at variable distances, from a few inches to 20 feet, providing the ability to optimize on a specified sub-range or operate throughout the extent of the range.

Accordingly, a variable distance angular symbology reader utilizes at least one light source and preferably a colaminated light source directing light through a beam splitter onto a target. The target may be angled relative to the impinging light up to and possibly greater than 45°. A camera located 90° from the light source provides an image from the target after it passes through a telecentric lens. This image can then be processed by a sensor and decoded by a processor.

DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
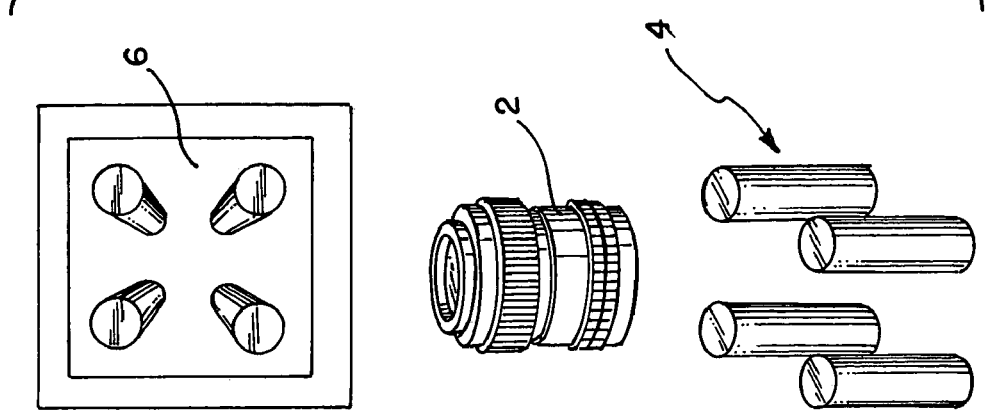
FIG. 1 shows a prior art conventional lens imaging an object showing the parallax problems.

FIG. 1 shows a conventional lens 2 spaced from an object 4. The image 6 produced by the lens 2 of the object 4 is also shown. As can be seen by the image 6, parallax or perspective errors can occur with a conventional lens 2. Closer objects appear relatively larger than those placed farther away for the same size object.

Figure 2:
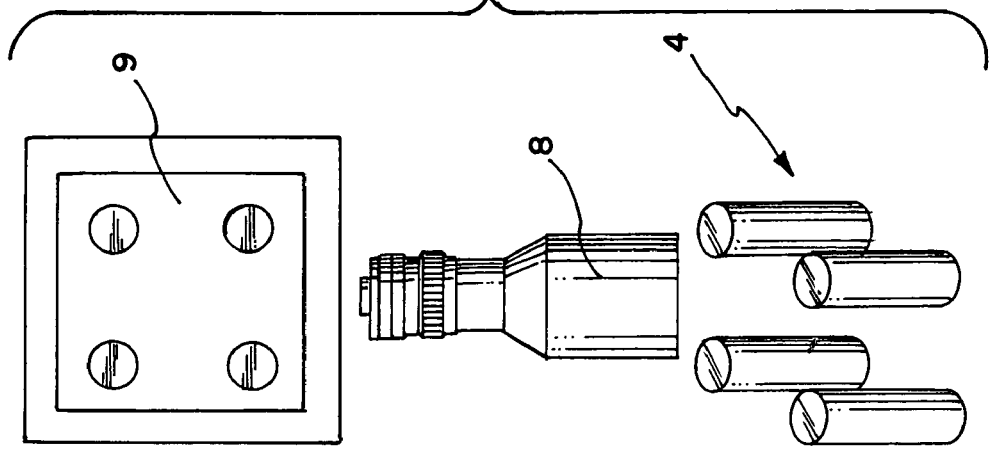
FIG. 2 is a telecentric lens imaging the same object shown in FIG. 1 showing how the telecentric lenses optically corrects for parallax over a defined range of the lens.

FIG. 2 shows a telecentric lens 8 imaging the same object 4. As can be seen from the image 9 in FIG. 2, telecentric lenses 8 optically correct for parallax or perspective errors so that the image 9 of objects 4 remain the same perceived size independent of the distance from the lens as defined over specified range for the particular lens.

Figure 3:
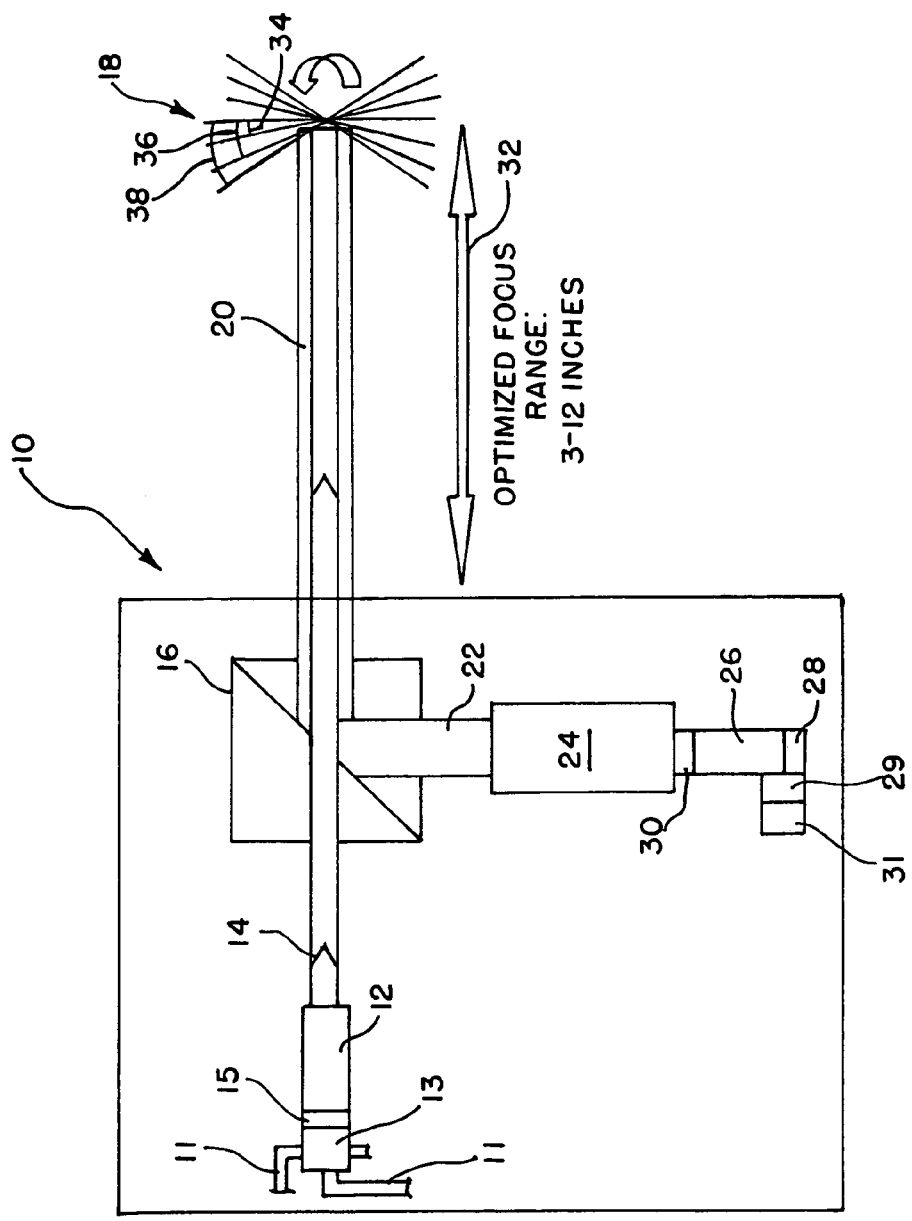
FIG. 3 is a schematic representation of the first preferred embodiment of the present invention.

The presently preferred embodiment of the invention is shown in FIG. 3. The reader 10 is comprised of a colliminated light source 12 which directs a first beam 14 through a beam splitter 16. A portion of the beam 14 continues through the beam splitter 16 and impinges upon target 18. Reflected beam 20 is then directed back from the target 18 to the beam splitter 16 where the directed beam 22 is projected through telecentric lens 24 and then received by camera 26 preferably having a CCD 28 (Charge Coupled Device) which records an image as reflected off the target 18. Colliminated light sources, or other light sources, may be provided from one or more LEDs (Light Emitting Diodes) delivered via fiber optic pipes, or otherwise. A combiner 13 may combine multiple sources 11 together. A focuser 15 could also be utilized.

The image from the CCD may be sent to a processor 29 as well as to a display 31. The processor 29 may translate the symbol on the target 18 to other representative data such as numbers like a part number or other appropriate data associated with the symbol on the target 18. Furthermore, the display 31 may assist in operating and locating the symbol on the target 18.

In this embodiment, the first beam 14 is directed 90° relative to the directed beam 22. Furthermore, in this embodiment, the camera 26 and CCD 28 are located 90° relative to the reflected beam 20. Furthermore, the camera 26 may include an extender 30 such as the two times extender 30 which can double the range of distance from the reader 10 to the target 18 as represented by focus range 32. In the preferred embodiment, the focus range 32 is normally anywhere from three to twelve inches, but with the two times extender 30 in place, it could be up to 24 inches or more depending on the optics utilized and the size of the image on the target 18.

The lens 24 utilized in a test prototype was a telecentric lens 24 having a 55 mm. focal length. In the mockup, the magnification adjustment was between 0.0 and 0.5×. This setup was believed to be advantageous to read a 12×12 matrix symbol size with 7.5 mm dots having a minimum size of 2.29 mm. This size matrix was easily imaged and decoded from approximately 4 to 12 inches. Larger symbols could be easily read out to several feet. Furthermore, the two times extender 30 read smaller code in the range of 10×10 size at a 1.9 mm range. This optimizer system operated from 3 to 4 inches all the way up to 15 inches.

The telecentric lens 24 yielded a relatively constant magnification over the range of the lens virtually eliminating viewer angle error. This allowed for the viewing of matrix code from an angle as much as up to at least 30° to about 45° within the optimum working distance and still able to decode the matrix. Target angles 34,36,38 are shown in FIG. 3.

With the use of a telecentric lens 24, correct and consistent distances can be determined with a higher degree of accuracy achieved. One of the reasons behind this is believed to stem from constant magnification that occurs even though the distance of the target 18 or image on the target from the lens 24 changes. This constant magnification allows for a user to maintain the correct perspective over change in height or change in slope.

The way a conventional lens works such as the one shown in FIG. 1 on viewing a matrix symbols at an angle is that it makes the holes (data elements) in the symbol become elliptical such as shown in FIG. 1 and create shadows. This is due to the phenomenon of parallax described above in which holes appear larger on the closest side of the symbol matrix and smaller on the further side of the matrix. This makes a symbol decoding next to impossible when a symbol is held at an angle. However, the telecentric lens 24 corrects for this phenomenon as described above, and produces an image in which the holes all appear the same size with very little shaped deformity. This enables the symbol on the target 18 to be decoded quite easily.

A need for this technology arises by nature of the difficulty in viewing matrix symbols as applied on smooth, reflective surfaces. If the symbol is viewed at low or no angle, light could be reflected directly back into the lens and the image could be washed out by the glare so that the matrix could not be decoded. Accordingly, the applicants discovered that the use of the telecentric lens 24 was an improvement over the prior art. It allowed the symbol to be held at an angle so that the image was not washed out by glare while producing an image having the same magnification across the entire field of view, which allowed the symbol to be easily decoded. This feature is found even to be more important when viewing a matrix symbol applied to a curved surface such as a screwdriver or other curved surface.

Optical symbology scanners using conventional lenses employ methods similar to those used in machine vision applications. They tend to wash out a target and thus compensate for wash out with various illumination schemes. The light sources are often provided in a multitude of configurations such as rings or rotating devices, but are generally located in front of the lens. In this manner, the scanner or camera sees light as it is reflected from an object. Since light is reflected differently from curved metal than from a label on a shipping container, for example, machine vision type illumination is designed to control how the object appears to the camera by controlling glare and reflection. Simply stated, the approach is to flood the area with uniform lighting. With this approach, specular surfaces perpendicular to the camera appear to be eliminated while surfaces at angle can appear dark. Non-specular surfaces absorb light and can appear dark.

By using the telecentric lens with a substantially constant magnification over a range of working distance, perspective angles can be virtually eliminated. Accordingly, when a matrix symbol is held at an angle such as the target angles 34,36,38, the image can be shown with little or no distortion. Accordingly, the matrix can be relatively easily decoded since the material surface reflection of impinging light is away from the reflected image back toward the telecentric lens 24. Existing scanners with conventional lenses view the subject symbol normal to the scanner and tolerate very little angular offset, thus being almost virtually incapable of decoding symbols on highly reflective or clear surfaces.

The preferred colliminated light source 12 provides a combination of visible and IR (infrared) range illumination sources to assist the camera 26 and/or CCD 28 in discriminating between data elements and non-data elements. The visible light source may be helpful in accurate targeting for the operator and providing illumination in low light conditions. The infrared light source may be helpful in angular reading of the symbols marked on highly reflective surfaces. Other wavelengths may also be utilized to assist in target contrast. Furthermore, offset lighting may be incorporated to assist in illumination for low light target areas beyond the optimally designed focus range 32.

Furthermore, FIG. 3 shows the light source 12 being located behind the beam splitter 16 and lens 24 relative to the target 18. Accordingly, the light source 12 projects from origination point behind the lens 24 and onto the target area 18 as shown. The prior art scanners are not known to utilize this configuration. While they may have a multiple light source and might even employ multiple wavelength light, they are not known to be combined in the beam splitter device in line with the optical access of the lens before being emitted toward a target symbol. This is believed to be a novel feature of at least this preferred embodiment.

Figure 4:
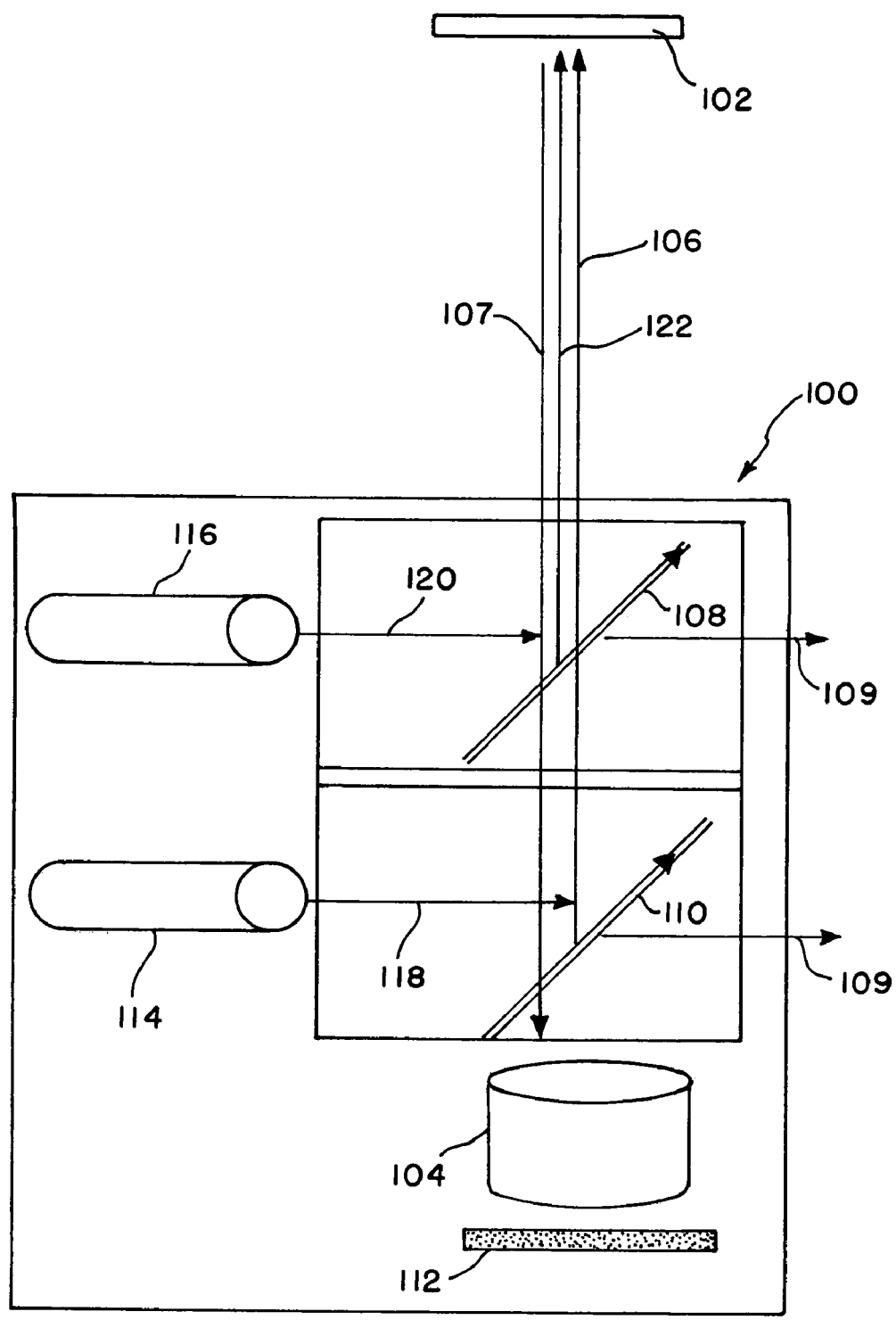
FIG. 4 is an alternatively preferred embodiment of the present invention.

Another object of the current invention is the use of a fiber optic light pipe as shown in FIG. 4 or a fiber optic bundle to transport the light source(s) into the optical path and onto the target area or as an assist to the inline light sources shown in FIGS. 2 and 3. This could be for applications where low amounts of light would be required, for close distances between the lens and the target, or for packaging consideration where standard scanner configurations would not be usable. Multiple light sources at user specified wavelengths could be utilized and combined into a single optical bundle to illuminate the target. This could be useful in applications where markings that fluoresce at certain wavelengths were utilized on a target. The design could be such that only one wavelength light source at time could be utilized, all the light sources powered at same time, or each light source powered sequentially. Applications with respect to symbol imaging would include the ability to read visible symbols at the same time as reading symbols marked with invisible (not visible to the human eye) UV or IR inks on top of the visible symbol. This could also enable the reading of invisible symbols in a stack (on items such as an ID badge, passport, etc.) marked with inks fluorescing at different wavelengths for validation of authenticity. This could also be used to electronically validate the fluorescing inks used on new currency by imaging all the patterns concurrently as it passes through currency counting machines at banks or even as a device to be attached to retail cash registers.

By utilizing a telecentric lens with a variable focal capability (i.e., auto focus) for detecting a symbol at a range of distances, decodability may be had as great as ten feet, twenty feet or more, or as close as just a couple of inches, or closer. Current scanners lack autofocus capability. Furthermore, since the telecentric lens has a focus range as opposed to a specific focal distance like a traditional lens, images can be decoded at all distances within the focal range. A fixed focal length lens cannot perform this function. By providing a range, certain applications may need to be performed at a lower cost. A scanner at a retail outlet such as a grocery store could be an excellent application of this technology. Other applications could include package sorting on a conveyor line such as could be performed for Fedex™ or UPS™ packages proceeding through a processing center.

Most conventional scanners use light emitting diodes (LEDs) as a illuminating source because LEDs are solid state components that when energized emit light of a specific spectrum. LEDs are available in many wave lengths, such as red, green, blue or white. Red LEDs are the brightest and most readily available of all the spectrums. Since many machine vision applications are monochrome and most cameras are sensitive to the red wave length, red LED's provide very efficient lighting.

In the alternatively preferred embodiment shown in FIG. 4, a reader 100 is shown imaging a target 102. In this embodiment the telecentric lens 104 is located in line with the impingement beam 106 which of course would be 180° offset from a reflected beam 107. The reflected beam 107 would return from the target 102, be received into the reader 100, pass through the first beam splitter 108, the second beam splitter 110, and through the telecentric lens 104 to contact the sensor 112 which is preferably a CCD sensor. In order to provide the impingement beam 106, this embodiment utilizes two light sources 114,116, the first light source provides an amber or red light beam 118 which contacts the second beam splitter 110. The second beam splitter 110 directs possibly half the light towards the target 102 through the first beam splitter 108 (of course, some of the beam may be lost passing through the first beam splitter 108) and is represented as unused beam 109. Unused beam 109 is one hundred eighty degrees offset from the second light source 116 is an infrared LED which directs its beam 120 towards the first beam splitter 108 such that about half the intensity is directed as second impingement beam 122 which is substantially parallel if not colinear with the first impingement beam 106. Although light emitting diodes (LED's) are shown as light sources 114,116, other light sources could also be used. LEDs may also be interchangeable and selectable. Additional optical components may also be utilized for beam and pattern forming in accordance with the present invention.

Another object of the current invention is the use of the angular reflection of the data cells (indentions or black cells with binary value of "1") for primary symbol decoding. The current embodiments image non data cells (area unmarked with binary value of "0") as all the same color or gray scale, eliminating the variation of color that many times confuses conventional scanners and makes the symbol undecodable. An example that illustrated this was a symbol laser marked on a steel plate with half of the symbol discolored with a torch. Standard decoding software averages the reflection of the non-data cells. The discolored areas were far from the average range of color, therefore the symbol could not be decoded with prior art scanners. With the current embodiments of the present invention, the non-data cell areas that were discolored had the light reflected away at an angle so the telecentric lens focused on the data cells, making the symbol decodable.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A symbol reader for reading marked regions on a substrate comprising:
    at least one light source providing an impingement beam;
    a beam splitter receiving the impingement beam from the at least one light source and splitting the impingement beam emitted from the at least one light source to allow some light from the impingement beam to contact the substrate as a contact beam while allowing some light to proceed in a first direction to not contact the substrate;
    a reflected beam proceeding one hundred and eighty degrees relative to the contact beam returned from the substrate, said reflected beam proceeding into the beam splitter where a first portion of the reflected beam is directed in a second direction 180 degrees relative to the first direction, and a second portion of the reflected beam passes through the beam splitter;
    a telecentric lens positioned relative to the beam splitter to receive one of the first and second portions of the reflected beam after passing through the beam splitter;
    a sensor located opposite of the telecentric lens from the beam splitter, said sensor receiving the portion of the reflected beam after it passes through the telecentric lens.

2. The symbol reader of claim 1 wherein the impingement beam, beam splitter and substrate are collinear.

3. The symbol reader of claim 1 wherein the telecentric lens, beam splitter and substrate are collinear.

4. The symbol reader of claim 1 wherein the first direction is forty five degrees relative to the impingement beam.

5. The symbol reader of claim 1 wherein the at least one light source provides light having an infrared wavelength.

6. The symbol reader of claim 1 wherein the at least one light source further comprises at least one LED.

7. The symbol reader of claim 6 wherein the at least one light source further comprises a beam combiner.

8. The symbol reader of claim 6 wherein the at least one light source further comprises a fiber light pipe directing the impingement beam at the beam splitter.

9. The symbol reader of claim 1 wherein the at least one light source provides collimated light.

10. A symbol reader for reading marked regions on a substrate comprising:
    at least one light source providing an impingement beam;
    a first beam splitter receiving the impingement beam from the at least one light source and splitting the impingement beam emitted from the at least one light source to allow some light from the impingement beam to contact the substrate as a first contact beam while allowing some light to proceed in a first direction to not contact the substrate, said first direction ninety degrees relative to the first contact beam;
    a reflected beam proceeding one hundred and eighty degrees relative to the first contact beam returned from a contact area on the substrate, said reflected beam proceeding into the first beam splitter where a first portion of the reflected beam is directed in a second direction 180 degrees relative to the first direction, and a second portion of the reflected beam passes through the beam splitter;
    a telecentric lens positioned relative to the first beam splitter to receive one of the first and second portions of the reflected beam after passing through the beam splitter;
    a sensor located opposite of the telecentric lens from the first beam splitter, said sensor receiving the portion of the reflected beam after it passes through the telecentric lens.

11. The symbol reader of claim 10 further comprising a second beam splitter and a second light source, said second light source providing a second impingement beam to the second beam splitter and the second beam splitter providing a second contact beam to the substrate to contact the substrate at the contact area.

12. The symbol reader of claim 11 wherein the second contact beam is substantially colinear with the first contact beam.

13. The symbol reader of claim 11 wherein the second light source is provided by a light emitting diode.

14. The symbol reader of claim 11 wherein the first beam splitter further comprises a 50/50 mirror.

15. The symbol reader of claim 10 wherein the telecentric lens receives the first portion of the reflected beam, and the telecentric lens is located substantially the same distance from the substrate as the first beam splitter.

16. The symbol reader of claim 10 further comprising a mangifier lens proximate to the telecentric lens.

17. The symbol reader of claim 10 wherein the telecentric lens has an optimum range intermediate about 3–4 inches to about 15 inches.

18. The symbol reader of claim 10 wherein the substrate is angled relative to a plane perpendicular to the first contact beam at the substrate intermediate about zero and about forty five degrees.

19. The symbol reader of claim 10 wherein the telecentric lens has an optimum range up to at least 20 feet.

* * * * *